US012384197B2

(12) United States Patent
Lambertson, Jr. et al.

(10) Patent No.: US 12,384,197 B2
(45) Date of Patent: Aug. 12, 2025

(54) COATING MATERIAL CONTAINER

(71) Applicant: SWIMC LLC, Cleveland, OH (US)

(72) Inventors: Michael C. Lambertson, Jr., Aurora, OH (US); Marcelo G. Orchon, Cleveland, OH (US); Connie M. McKinney, Hudson, OH (US); Charles T. Buckel, Jr., Valley City, OH (US)

(73) Assignee: SWIMC LLC, Cleveland, OH (US)

( * ) Notice: Subject to any disclaimer, the term of this patent is extended or adjusted under 35 U.S.C. 154(b) by 18 days.

(21) Appl. No.: 18/197,921

(22) Filed: May 16, 2023

(65) Prior Publication Data

US 2024/0017565 A1 Jan. 18, 2024

Related U.S. Application Data

(60) Provisional application No. 63/389,619, filed on Jul. 15, 2022.

(51) Int. Cl.
*B44D 3/12* (2006.01)

(52) U.S. Cl.
CPC ............ *B44D 3/127* (2013.01); *B44D 3/121* (2013.01); *B44D 3/128* (2013.01)

(58) Field of Classification Search
CPC ........ B44D 3/127; B44D 3/121; B44D 3/128; B44D 3/12; B65D 25/2838; B65D 25/2844; B65D 25/285; B65D 25/2852; B65D 25/2861; B65D 25/2864
USPC ........................................ 220/659, 696, 755
See application file for complete search history.

(56) References Cited

U.S. PATENT DOCUMENTS

| | | | |
|---|---|---|---|
| 109,090 | A | 11/1870 | Wilson |
| 3,361,290 | A | 1/1968 | Matthews et al. |
| 4,014,465 | A | 3/1977 | Ritter |
| 5,269,438 | A | 12/1993 | Kelsey |
| 5,377,858 | A | 1/1995 | Morris, Sr. |
| 5,765,888 | A | 6/1998 | Stack |
| 5,775,483 | A | 7/1998 | Lown et al. |

(Continued)

FOREIGN PATENT DOCUMENTS

| | | | |
|---|---|---|---|
| GB | 2262929 | A | 7/1993 |
| GB | 2413266 | A | 10/2005 |

(Continued)

OTHER PUBLICATIONS

International Search Report and Written Opinion from corresponding International Application No. PCT/US2023/027609 mailed on Nov. 14, 2023, 12 pages.

*Primary Examiner* — Nathan J Jenness
*Assistant Examiner* — Madison L Poos
(74) *Attorney, Agent, or Firm* — Tucker Ellis LLP

(57) ABSTRACT

Provided is a container including a container body, a bail removably attached to the container body, a lid removably attached to a top of the container body, and a flexible band attached to the container body. The flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user's hand between the rear of the container body and the flexible band.

20 Claims, 14 Drawing Sheets

(56) References Cited

U.S. PATENT DOCUMENTS

| | | | | |
|---|---|---|---|---|
| 5,893,489 | A * | 4/1999 | Giarrante | B44D 3/127 D9/449 |
| 5,896,993 | A | 4/1999 | Nask et al. | |
| 6,983,862 | B2 | 1/2006 | Nottingham et al. | |
| 6,991,829 | B2 * | 1/2006 | Bergman | B65D 25/2817 220/769 |
| 7,337,901 | B2 | 3/2008 | Phillips | |
| 8,157,122 | B2 | 4/2012 | Dale | |
| 10,435,205 | B1 | 10/2019 | Tubbs | |
| 10,494,145 | B2 | 12/2019 | Hudson et al. | |
| 10,717,580 | B2 | 7/2020 | Hudson et al. | |
| 2002/0125385 | A1 | 9/2002 | Tweed | |
| 2004/0188377 | A1 | 9/2004 | Balade | |
| 2005/0009856 | A1 | 1/2005 | Brotchie et al. | |
| 2005/0098564 | A1 | 5/2005 | Verbrugge et al. | |
| 2007/0295768 | A1 * | 12/2007 | Gringer | B65D 25/2829 222/570 |
| 2009/0129046 | A1 * | 5/2009 | Fong | G03B 15/06 362/18 |
| 2011/0259891 | A1 * | 10/2011 | Thibault | B44D 3/14 224/195 |
| 2013/0306497 | A1 | 11/2013 | Llewellyn et al. | |
| 2016/0010164 | A1 | 1/2016 | Caux et al. | |
| 2016/0101646 | A1 | 4/2016 | Kiceniuk | |
| 2017/0233160 | A1 | 8/2017 | Hudson et al. | |
| 2018/0127181 | A1 | 5/2018 | Warren et al. | |
| 2020/0027685 | A1 | 1/2020 | Kengoyama et al. | |
| 2020/0148432 | A1 | 5/2020 | Davies | |
| 2020/0276859 | A1 | 9/2020 | Lambertson, Jr. et al. | |

FOREIGN PATENT DOCUMENTS

| | | | |
|---|---|---|---|
| JP | 9-12516 | Y1 | 9/1934 |
| JP | 40-17585 | Y1 | 6/1965 |
| JP | 55-47199 | Y2 | 11/1980 |
| WO | 0224537 | A1 | 3/2002 |
| WO | 03047982 | A2 | 6/2003 |

* cited by examiner

COATING MATERIAL CONTAINER

RELATED APPLICATIONS

This application claims the benefit of U.S. Provisional Application No. 63/389,619 filed Jul. 15, 2022, which is hereby incorporated herein by reference.

TECHNICAL FIELD

Embodiments of the subject matter disclosed herein relate to a container, and more particularly to a container for a coating material.

BACKGROUND

Containers can be provided for holding a coating material, such as paint. The containers can include a handle for a painter to hold. The container can be smaller than a traditional paint container, such as a paint can, to provide a lighter weight and easier to hold container for the painter.

BRIEF DESCRIPTION

According to an aspect, a container is provided that includes a container body having a front, a rear, a right side, a left side, and a bottom that define a cavity for receiving a coating material, a bail removably attached to the container body, a lid removably attached to a top of the container body, and a flexible band attached to the rear of the container body, wherein the flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user's hand between the rear of the container body and the flexible band.

According to another aspect, a container is provided that includes a container body having a front, a rear, a right side, a left side, and a bottom that define a cavity for receiving a coating material, a bail removably attached to the container body, a flexible band attached to the rear of the container body, and a lid removably attached to a top of the container body, the lid including includes a cutout that defines with the front of the container body an opening for receiving an attachment, and a flap moveable between an open position allowing access to the cavity and a closed position closing the opening.

According to still another aspect, a container is provided that includes a container body having a front, a rear, a right side, a left side, and a bottom that define a cavity for receiving a coating material, the front, rear, right side, and left side each include a rim portion extending around tops thereof that form an upper rim, a projection projecting rearwardly from the rear, a bail removably attached to the container body, a flexible band attached to the rear of the container body, and a lid removably attached to a top of the container body at the upper rim, the lid including includes a cutout that defines with the front of the container body an opening for receiving an attachment, and a flap moveable between an open position allowing access to the cavity and a closed position closing the opening, wherein the flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user's hand between the rear of the container body and the flexible band.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
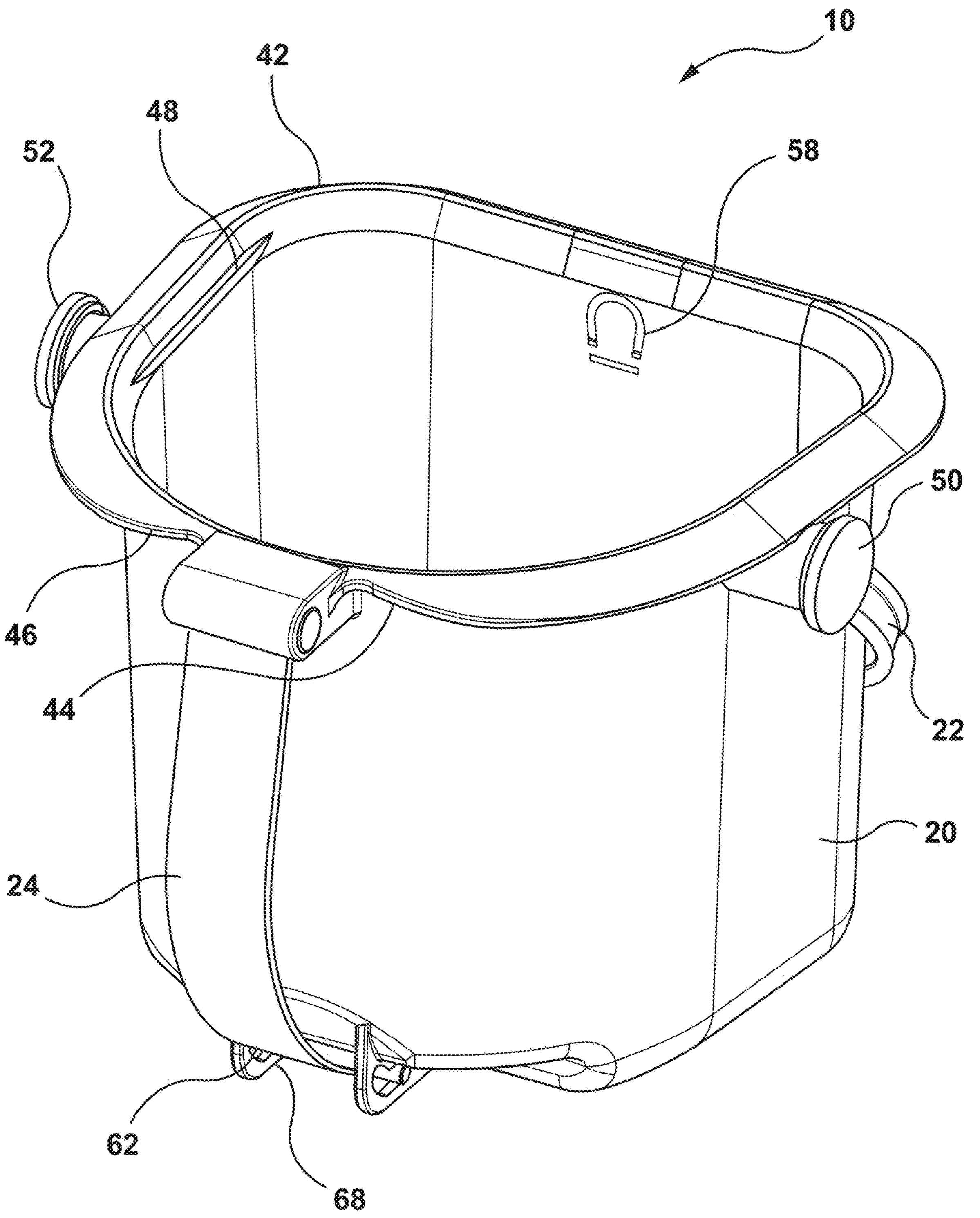
FIG. 1 is a perspective view of an exemplary container.

Embodiments of the provided subject matter relate to a container and methods of holding the container.

With reference to the drawings, like reference numerals designate identical or corresponding parts throughout the several views. However, the inclusion of like elements in different views does not mean a given embodiment necessarily includes such elements or that all embodiments of the invention include such elements.

Figure 2:
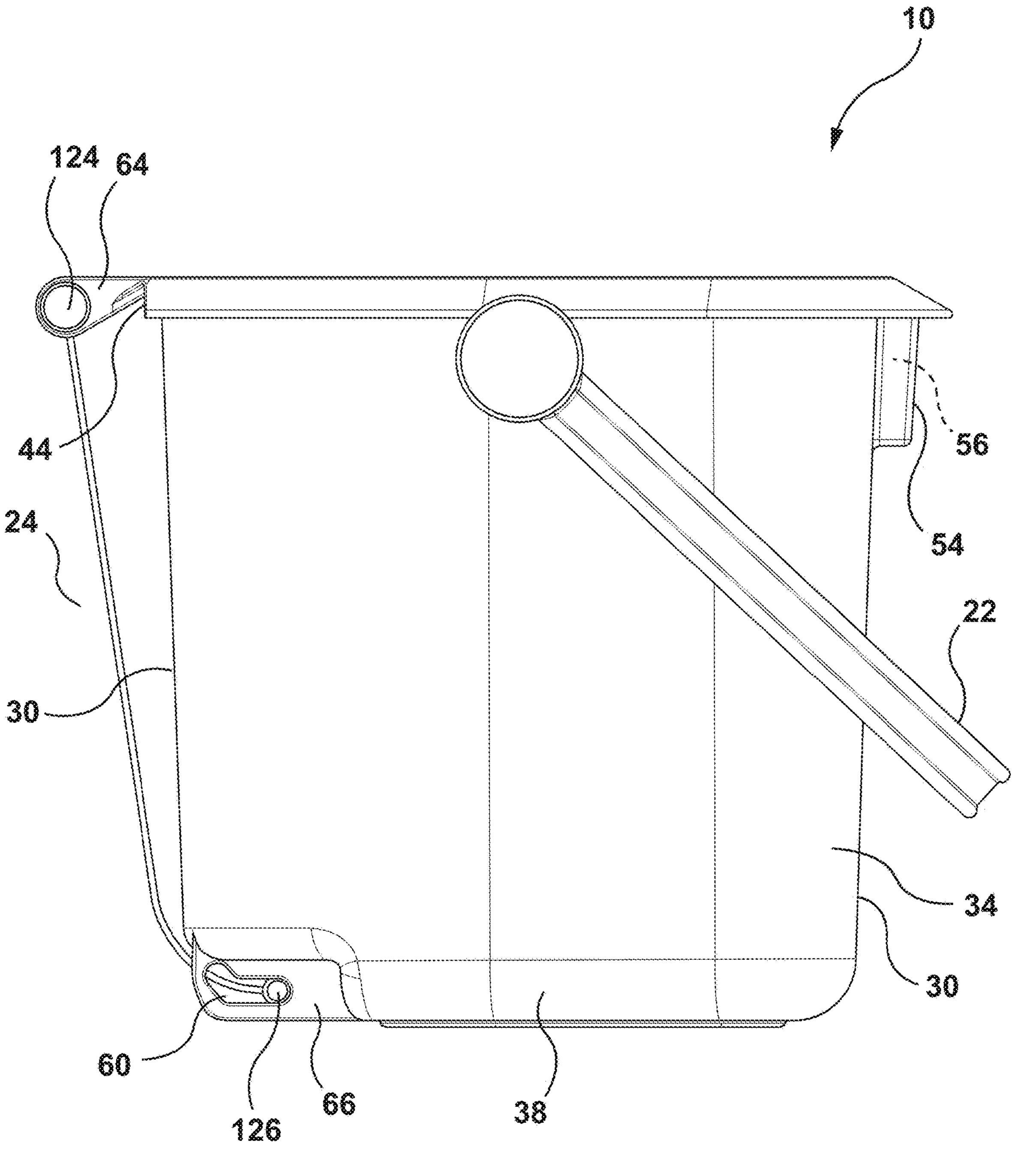
FIG. 2 is a side view of the container.
Figure 3:
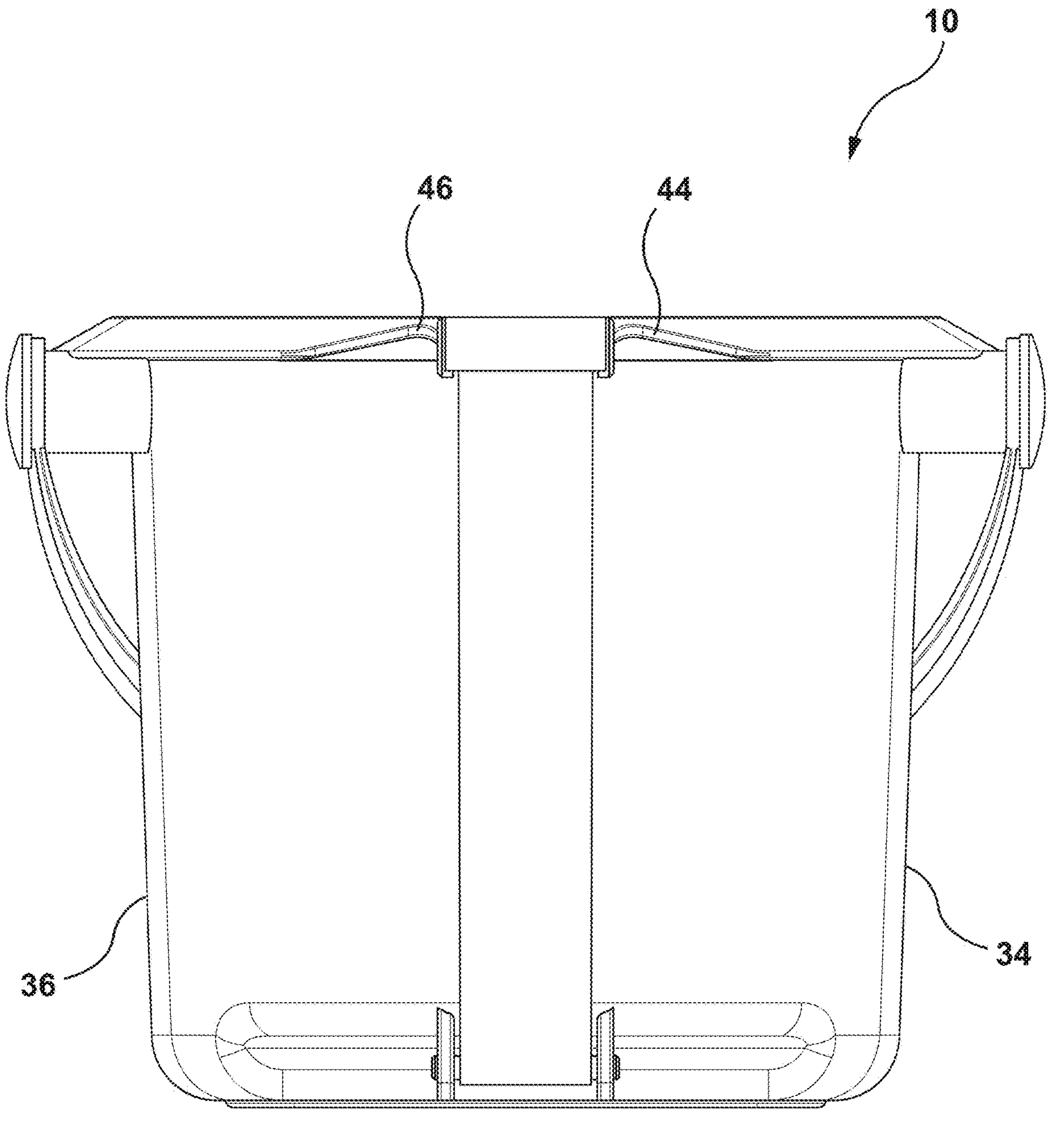
FIG. 3 is a rear view of the container.

Referring initially to FIGS. 1-3, an exemplary container is shown at reference numeral 10. The container 10 is provided for holding a coating material, such as paint, and can receive/secure suitable painting implements, such as a brush 14 (FIG. 6), for example a four inch or smaller brush, a roller, etc. The container 10 includes a container body 20, a bail 22 attached to the container body 20, and a flexible band 24 attached to the container body 20. The container body 20 includes a front 30, a rear 32, a right side 34, a left side 36, and a bottom 38 that define a cavity 40 for receiving the coating material. The front 30, rear 32, right side 34, and left side 36 each include a rim portion extending around tops thereof that is collectively referred to herein as an upper rim 42. The upper rim 42 includes one or more cutouts, and as shown a pair of cutouts 44 and 46 in the upper rim at the rear 32 of the container for user's thumbs providing thumb relief areas whether held in a user's left hand or a user's right hand. The left and right sides 36 and 34 each have a substantially parallel planar portion to one another and curved portions that curve toward the curved rear, and the front 30 may be substantially planar. The right side 34 and left side 36 also include ears 50 and 52 projecting outward therefrom to which the bail 22 is attached, and one or more bars 48, such as a brush wipe bar, projecting inward from inner surfaces thereof near tops of the sides.

The front 30 of the container 10 defines an area 54 for housing a magnet 56 for supporting the brush 14. The magnet may be molded into the front or otherwise incorporated into the front such that it extends outward from the front 30 and the inner surface of the front 30 is substantially planar. Indicia 58, such as an image of a magnet, may be provided on the inner surface of the front 30 to indicate the location of the magnet.

Turning now to the rear 32 of the container 10, the rear 32 of includes a pair of opposed slots 60 and 62 proximate the bottom 38 and a projection 64 projecting rearwardly from the rear 32 that provides a surface for a user's thumb to rest, for example when the container 10 is being held with the user's hand between the container body 20 and the flexible band 24. The cutouts 44 and 46 may be provided on opposite sides of the projection 64. The projection 64 may define a cavity for receiving an end of the flexible band 24, and include openings at opposite ends thereof for attachment of the flexible band 24 to the projection 64. As shown, the slots 60 and 62 are in respective projections 66 and 68 that project from the rear 32 and the projection 64 projects from the rim portion of the rear 32. The slots 60 and 62 may each have a first portion, which is substantially horizontal, and a second portion, which is at an obtuse angle from the horizontal portion.

Figure 7:
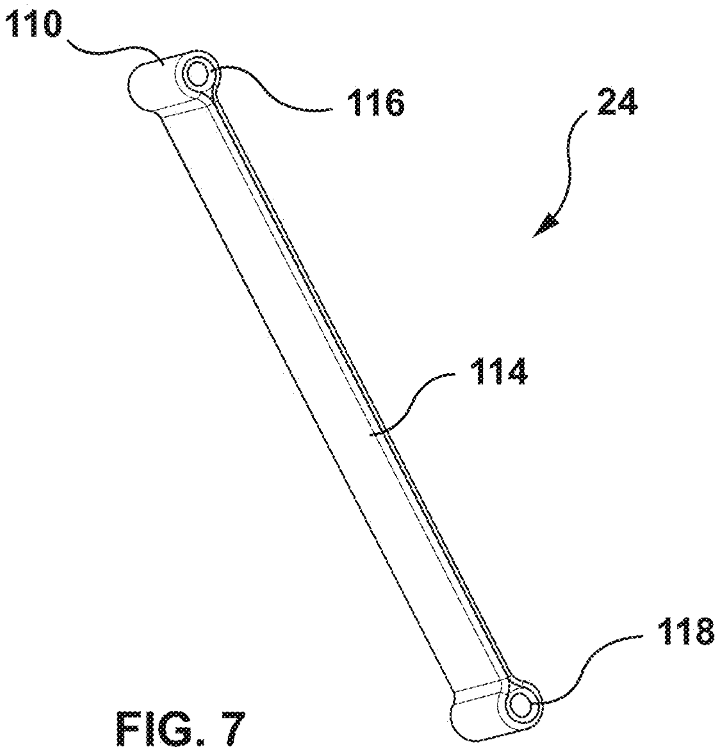
FIG. 7 is a perspective view of an exemplary flexible band.

Referring additionally to FIG. 7 and the flexible band 24 in detail, the flexible band 24 includes a first end 110 configured to be rotatably attached to the rear 32 proximate a top of the rear 32, for example at the projection 64, and a second end 112 configured to be rotatably attached to the rear 32 proximate a bottom of the rear 32, for example at the opposed slots 60 and 62. The flexible band 24 also includes a substantially planar portion 114 disposed between first and second tubular portions 116 and 118 at the first and second ends 110 and 112 respectively. The tubular portions 116 and 118 each include a through passage for receiving a suitable fastener. For example, the first tubular portion 116 may be positioned in the cavity in the projection 64 and aligned with the openings in the projection. A pin 124 or other suitable fastener is then inserted through the through passage to attach the first end 110 of the flexible band 24 to the projection 64. Similarly, the second tubular portion 118 may be positioned between the slots 60 and 62 in the projections 66 and 68 proximate the bottom 38 and a pin 126 or other suitable fastener is inserted through the through passage to attach the second end 112 of the flexible band 24 to the projections 66 and 68. The first end 110 of the flexible band 24 will thereby be rotatably attached to the projection 64, while the second end 112 of the flexible band will be rotatably attached to the projections 66 and 68 and movable within the slots 60 and 62.

Figure 11:
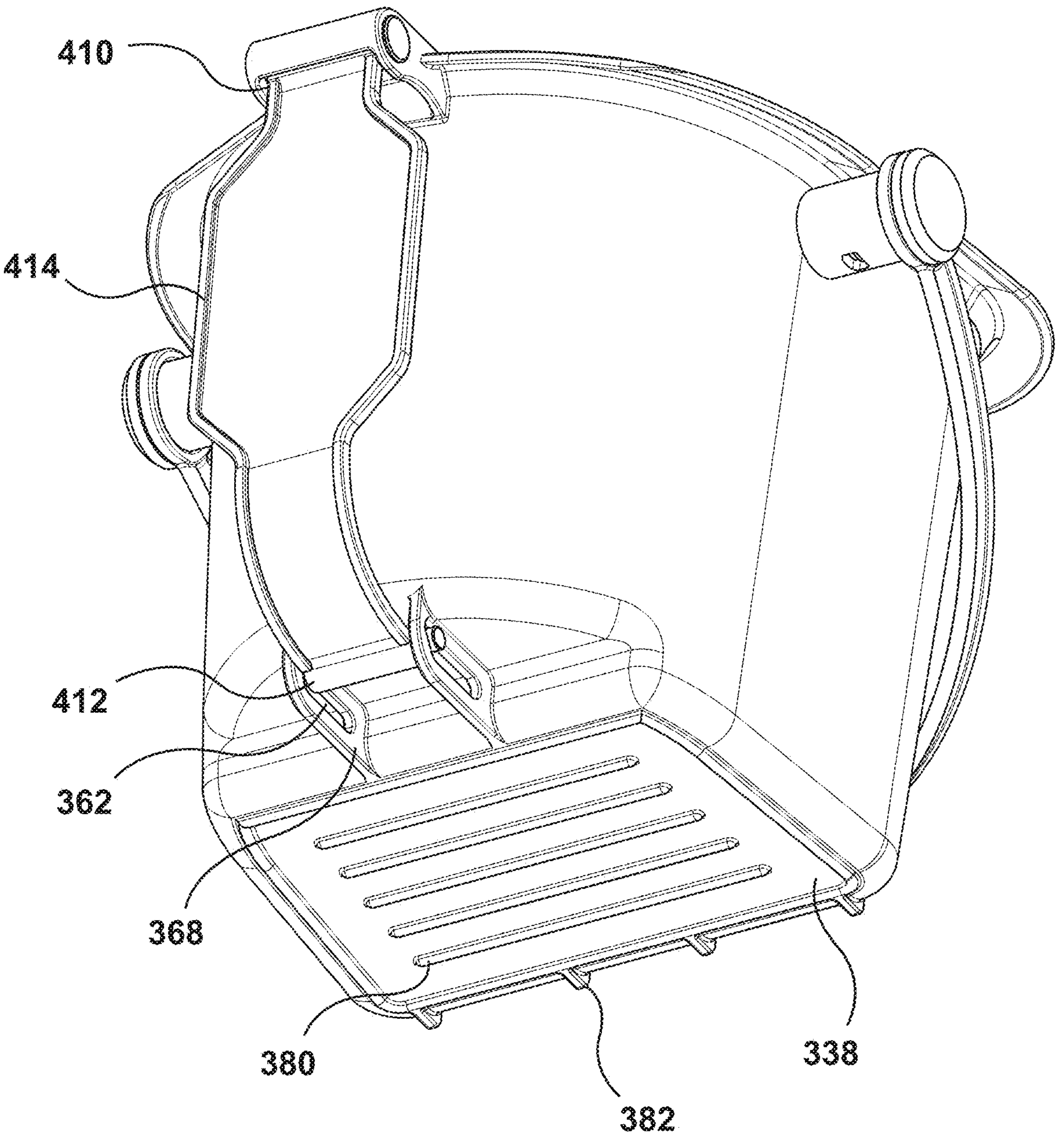
FIG. 11 is a bottom perspective view of the container.
Figure 12:
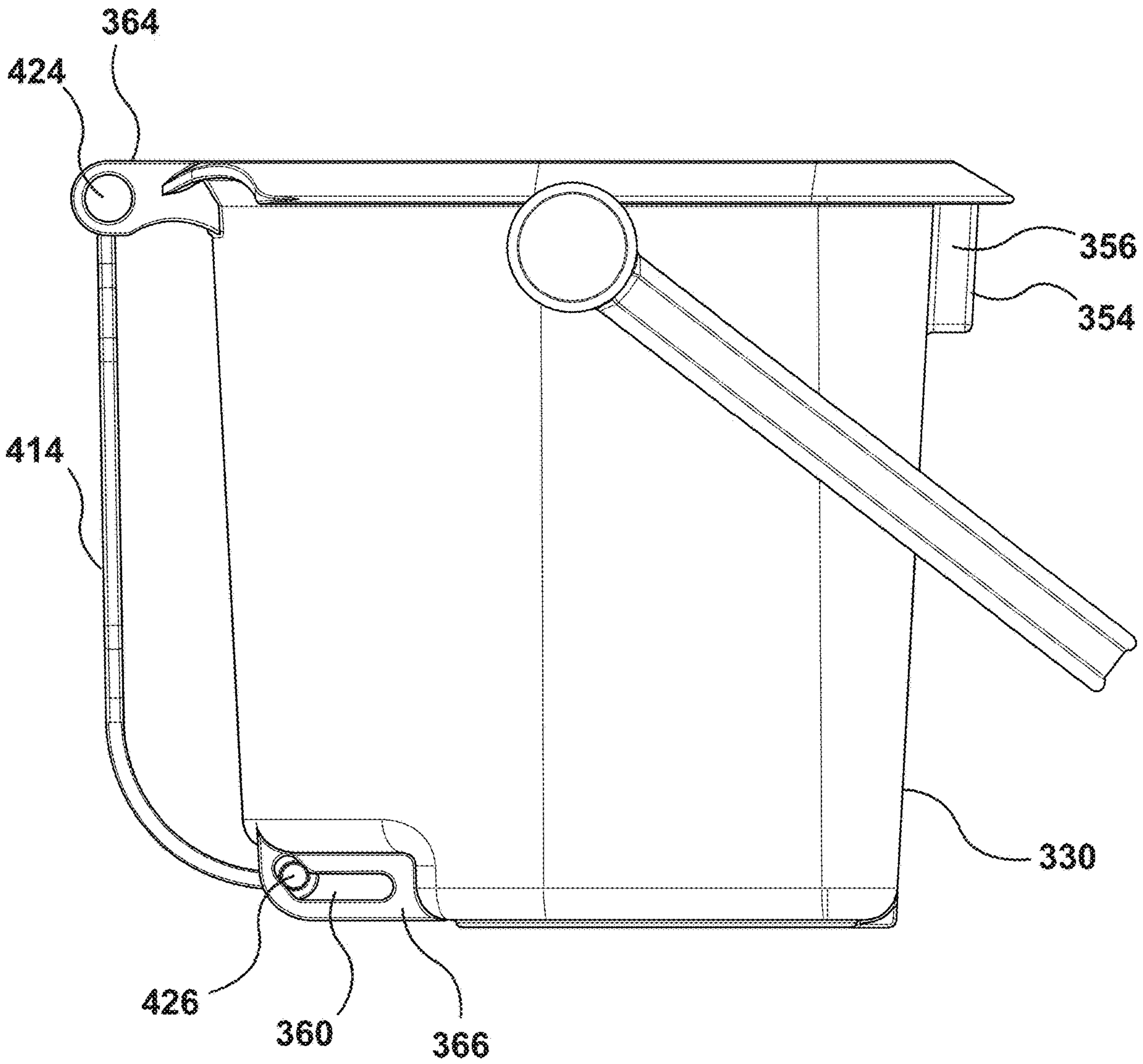
FIG. 12 is a side view of the container.
Figure 13:
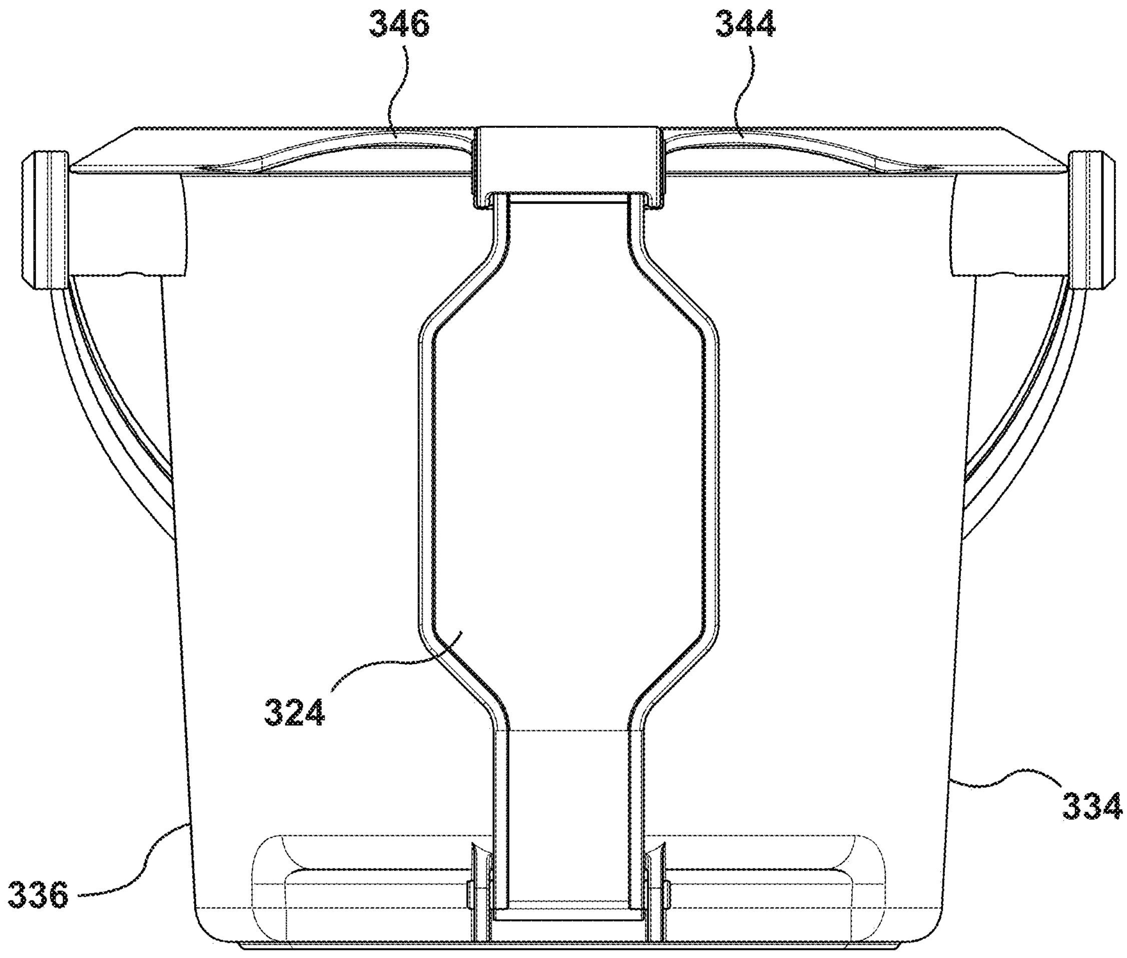
FIG. 13 is a rear view of the container.
Figure 14:
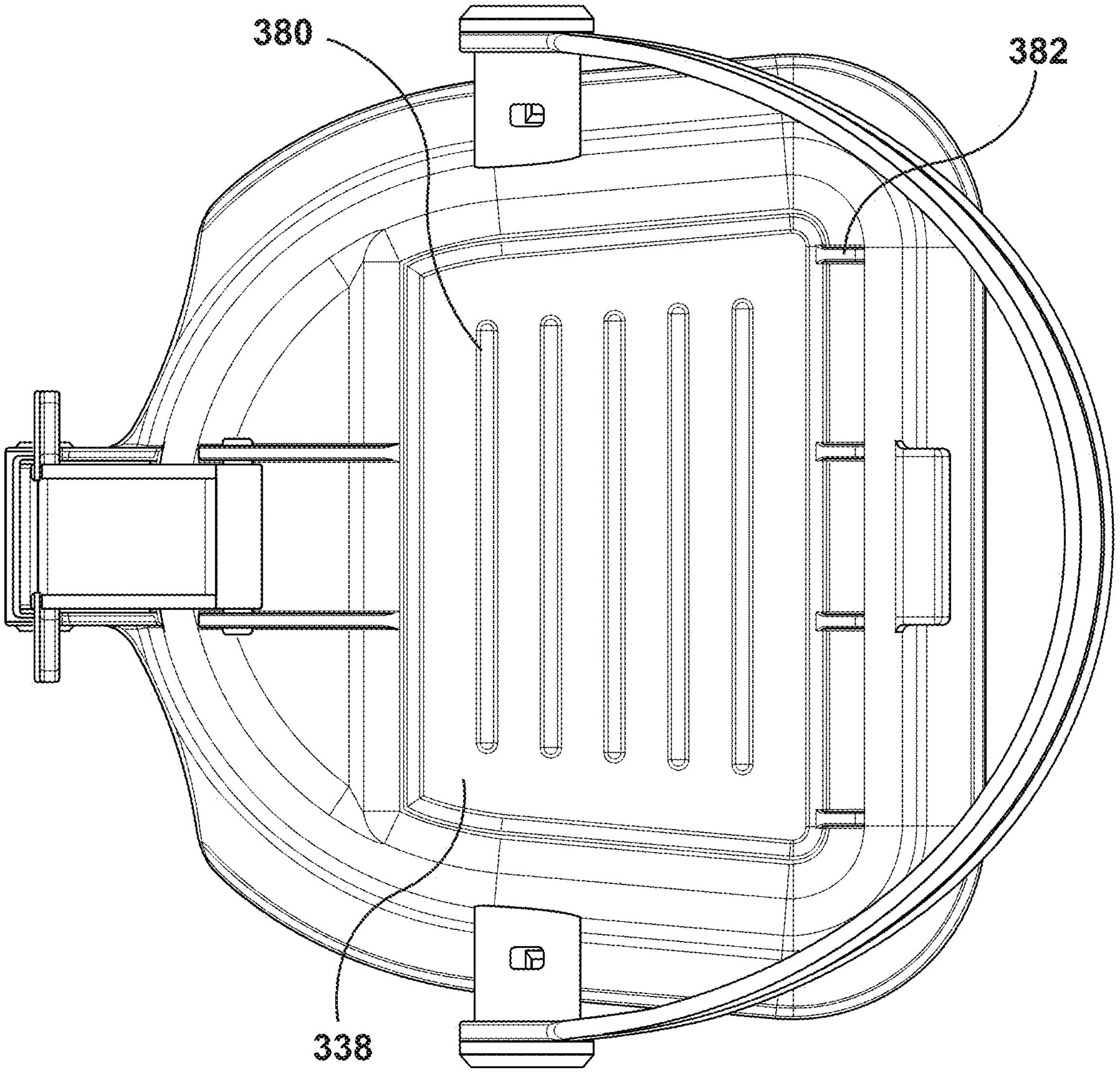
FIG. 14 is a bottom view of the container.
Figure 15:
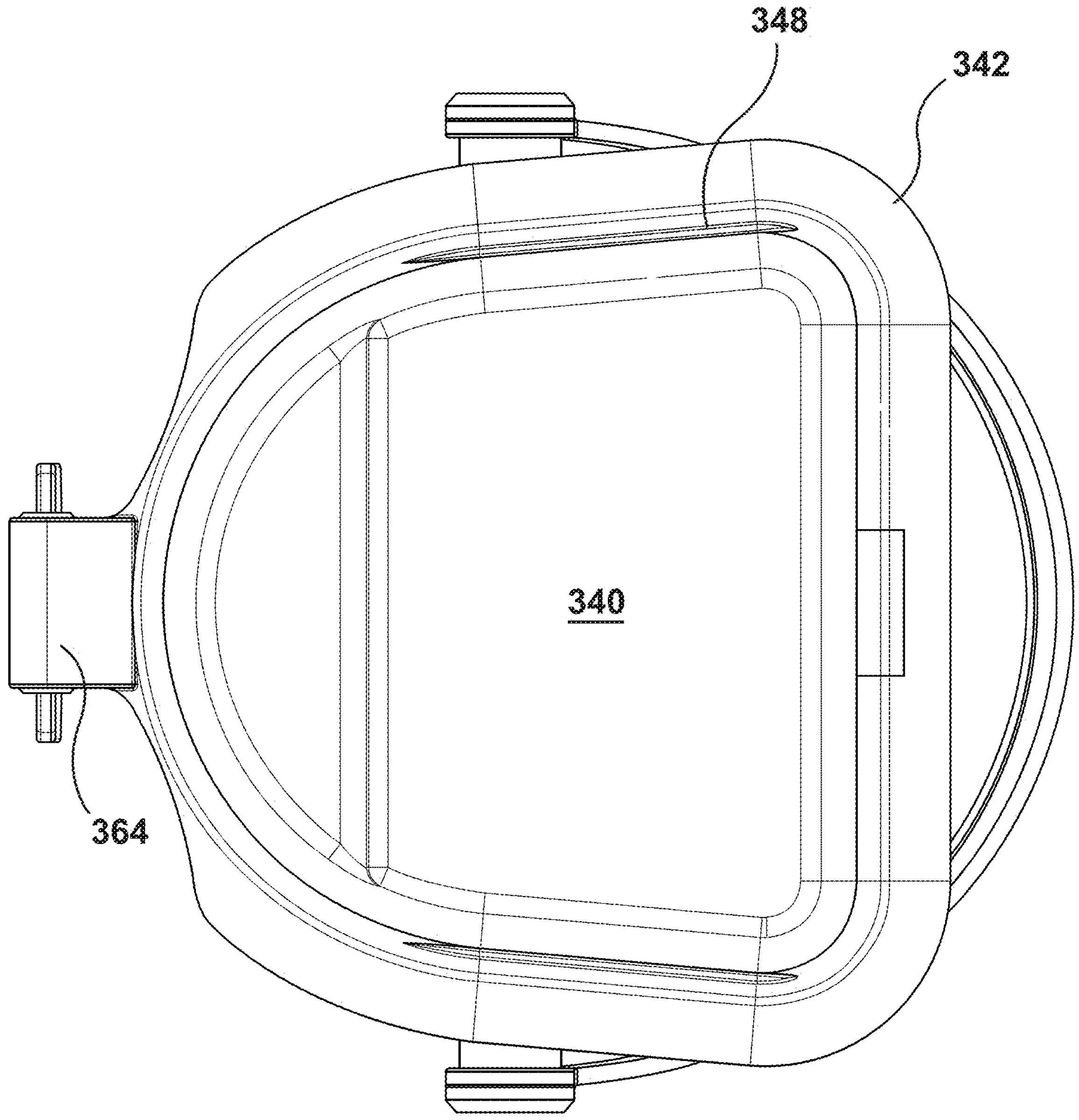
FIG. 15 is a top view of the container.

The flexible band 24 is movable between a first position spaced a first distance from the rear 32 as shown in FIG. 1, a second position spaced a second distance from the rear 32 less than the first distance to allow the rear 32 of the container body and the bail 22 to be grasped without interference by the flexible band 24, and a third position spaced a third distance from the rear 32 greater than the first distance to provide space for a user's hand between the rear 32 of the container body 20 and the flexible band 24 (see for example FIG. 11). As shown in FIG. 1, when the flexible band 24 is in the first position, the second end 112 of the flexible band 24 and the pin 126 are at a front of the slots 60 and 62. When the flexible band 24 is in the second position and the third position respectively, the second end 112 of the flexible band 24 and the pin 126 are at a top rear of the slots 60 and 62. It will be appreciated that although described as being at the top rear of the slots 60 and 62, the second end 112 of the flexible band 24 may be at another position, such as at a middle of the slots, for example to adjust for the size of the user's hand. When the flexible band 24 is in third position, the user can place the user's fingers between the flexible band 24 and the rear 32 of the container body 20, with the user's palm adjacent the rear, and rest the user's thumb on a top of the projection 64.

Figure 8:
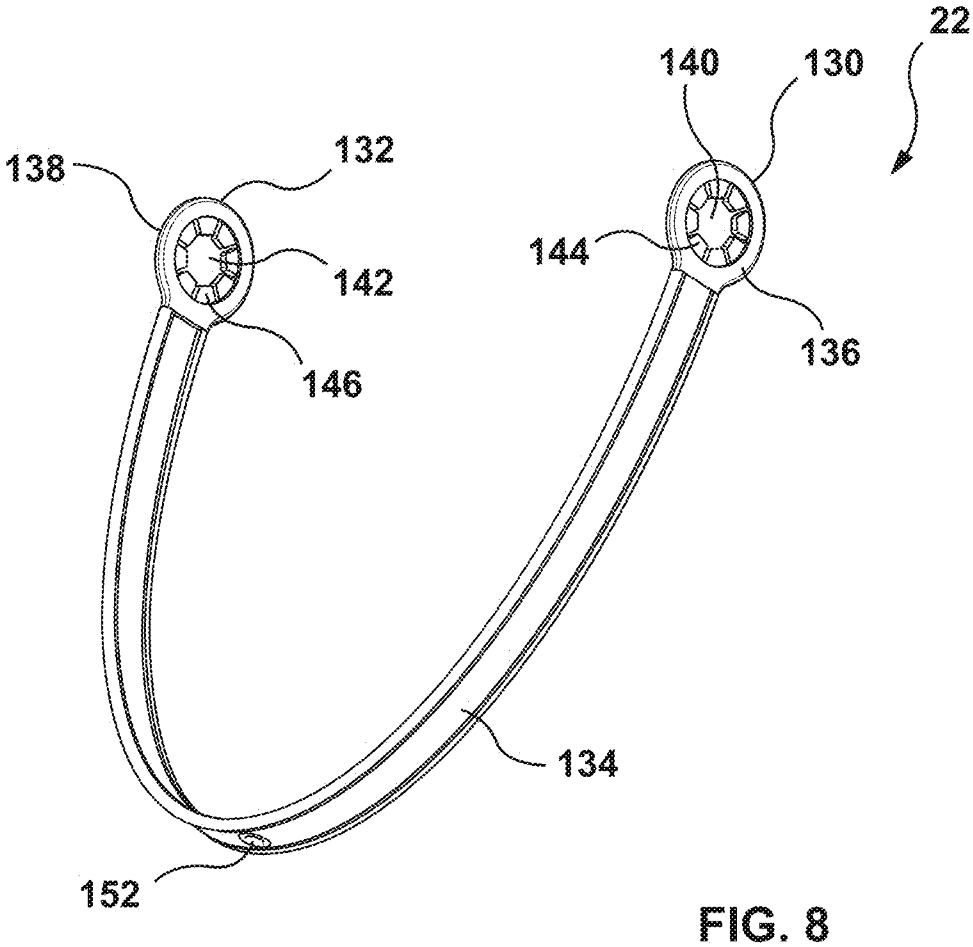
FIG. 8 is a perspective view of an exemplary bail.

Referring now to FIG. 8 and the bail 22 in detail, the bail 22 includes a first end 130 configured to be rotatably attached to the ear 50, a second end 132 configured to be rotatably attached to the ear 52, and a body 134 disposed between the first and second ends 130 and 132. The bail also includes attachment portions 136 and 138 at the first and second ends 130 and 132 respectively. The attachment portions 136 and 138 are substantially circular having respective openings 140 and 142 through which the ears 50 and 52 extend. Each attachment portion 136, 138 includes a plurality of circumferentially spaced tabs 144 and 146 surrounding the openings 140 and 142 respectively that are configured to flex to allow the bail 22 to pass over flanges of the ears 50 and 52 for attachment/removal of the bail 22 to/from the ears 50 and 52. The bail 22 can additionally include an opening 152 in the body 134, as shown proximate a center of the bail 22, which is configured to receive a ladder hook to allow for hanging from a ladder.

The bail 22 is movable between a first position extending above the cavity 40 to allow the container 10 to be held by the bail 22, a second position behind the rear 32 of the container 10 to allow the container to be held by the bottom 38 and rear 32 and be supported by the bail 22, and a third position in front of the front 30 of the container 10 as shown in FIG. 1 to allow the flexible band 24 to be utilized without interference by the bail 22 or to allow the container to be held by the bottom 38 and front 30 and be supported by the bail 22.

Figure 4:
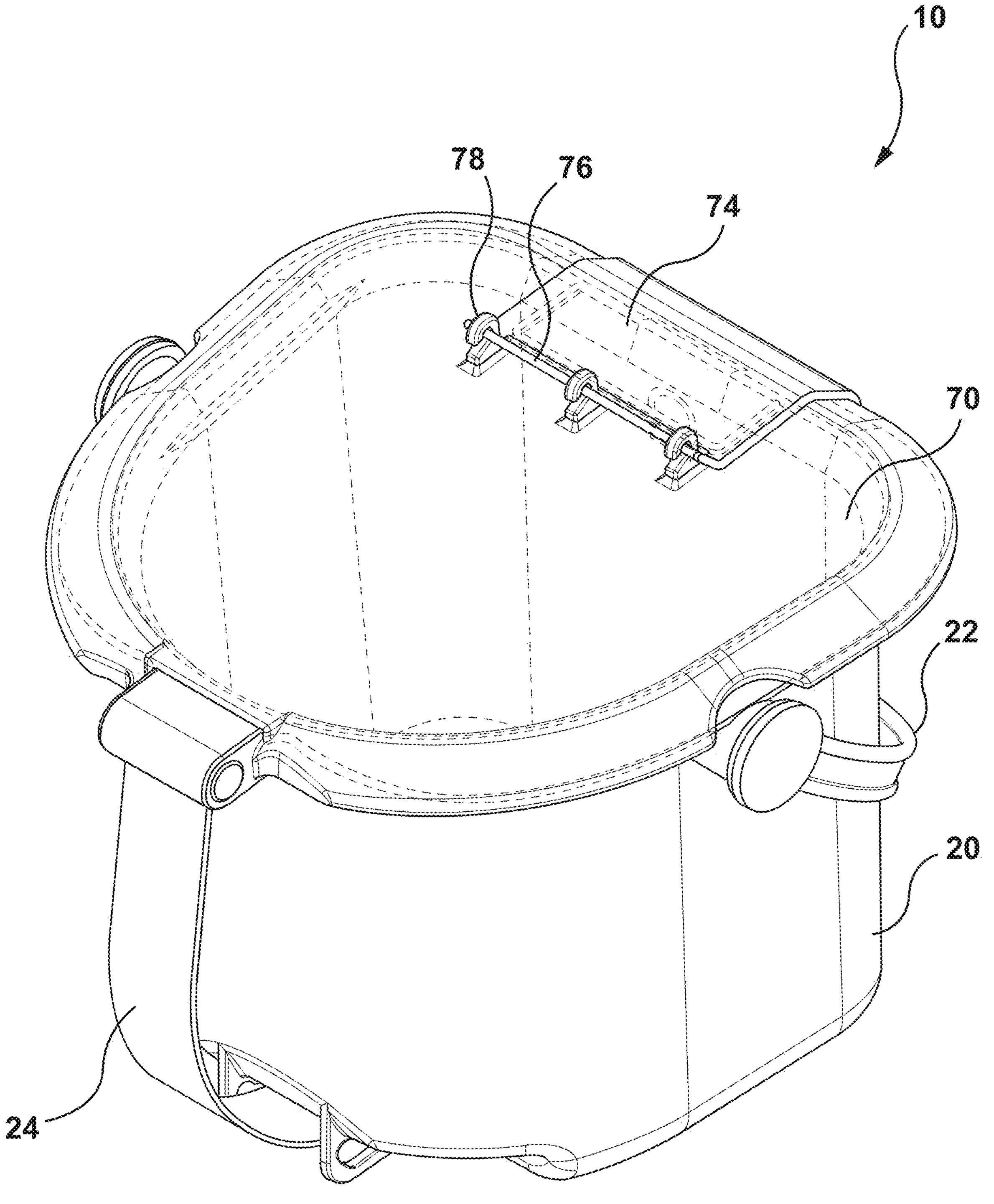
FIG. 4 is a perspective view of the container with a lid.
Figure 5:
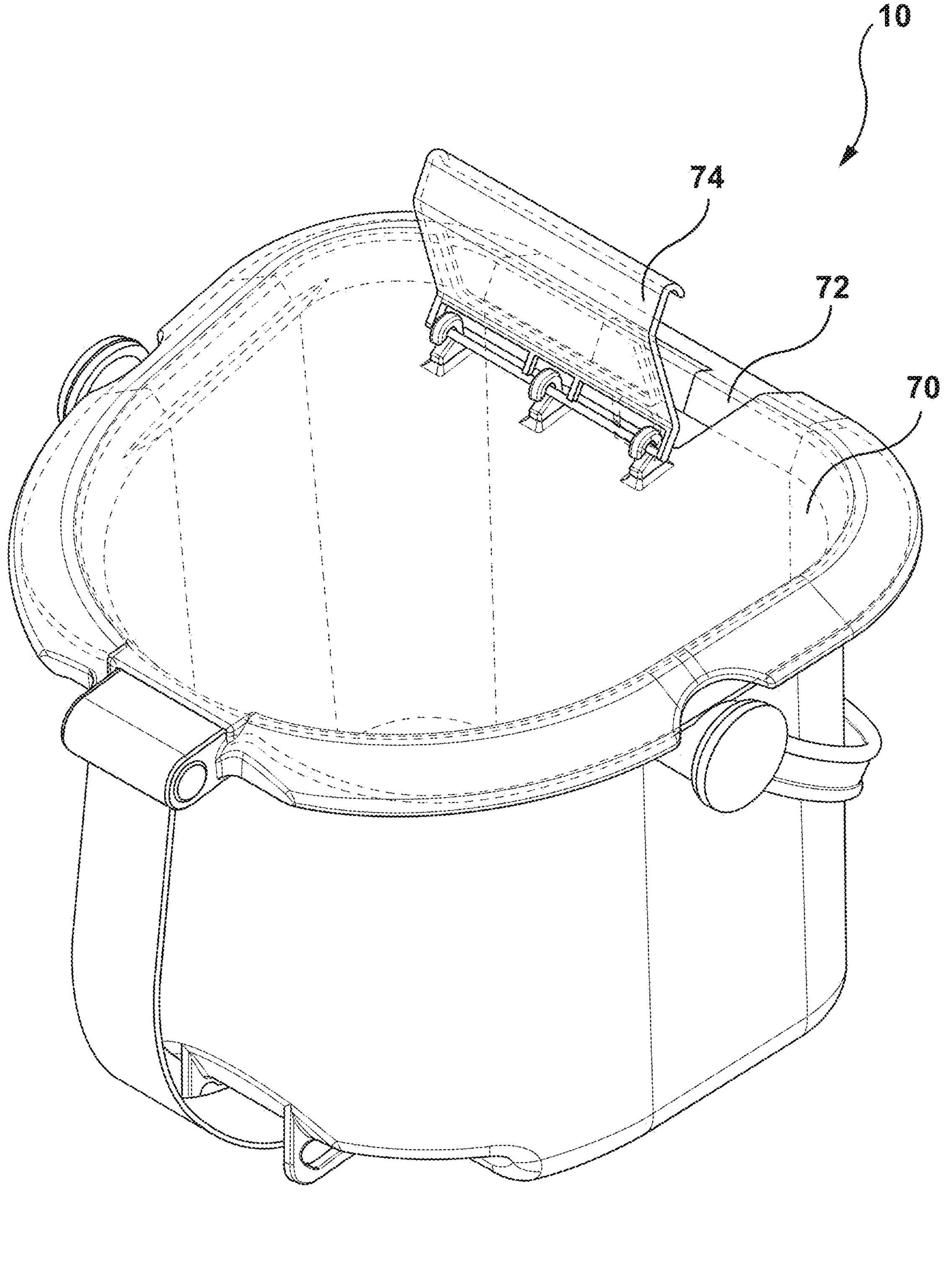
FIG. 5 is another perspective view of the container with lid.
Figure 6:
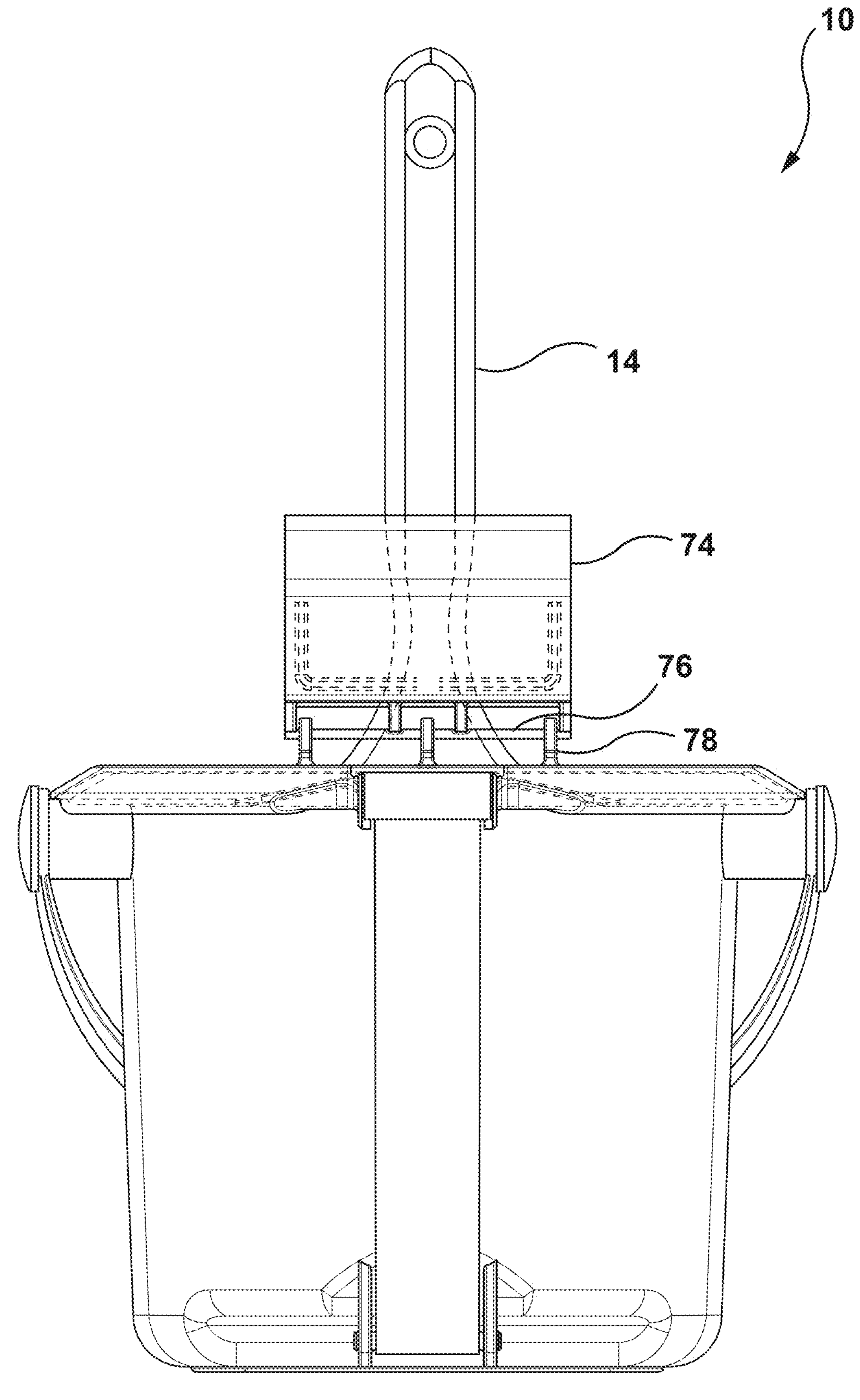
FIG. 6 is a rear view of the container with lid.

Turning now to FIGS. 4-6, the container 10 may include a lid 70 that removably attaches to the top of the container body 20, for example via a snap fit connection to the upper rim 42. The lid may be sized to correspond to a shape of the upper rim 42 to create an airtight attachment to the container body 20 to prevent coating material in the cavity 40 from hardening. The lid may be made of a suitable material, such as plastic, and may be transparent to allow a user to view the contents of the container.

The lid 70 may include an opening 72 or cutout at a front of the lid 70 adjacent the front 30 of the container body 20, for example to allow the brush 14 access to the coating material in the container 10 while the lid 70 is attached to the container body 20. The opening may be closed by a flap 74, which is movable between one or more open positions shown in FIGS. 5 and 6 and a closed position shown in FIG. 3 attached to the front of the container body 20, for example by a snap fit. The flap 74 may be removably attached to the lid 70 in a suitable manner. For example, the flap 74 may include a bar 76 that removably attaches to one or more clips 78 projecting upward from and opening to a rear of the lid 70 to allow for insertion/removal of the flap 74 to the lid 70. Alternatively, the flap may be attached by a hinge, such as a living hinge.

The lid 70 may include a suitable number of clips 78, and as shown three laterally spaced clips. The clips 78 allow the bar 76 to pivot relative to the clips 78 for opening and closing the flap 74. In an embodiment, the lid 70 and/or flap 74 may include a suitable seal for sealing to the container body 20. In an embodiment, the opening 72 has a width that is wide enough to allow a handle of the brush 14 to extend through the opening 72. In another embodiment, the opening 72 has a width that is wide enough to allow the entire brush 14 access to the container.

Figure 9:
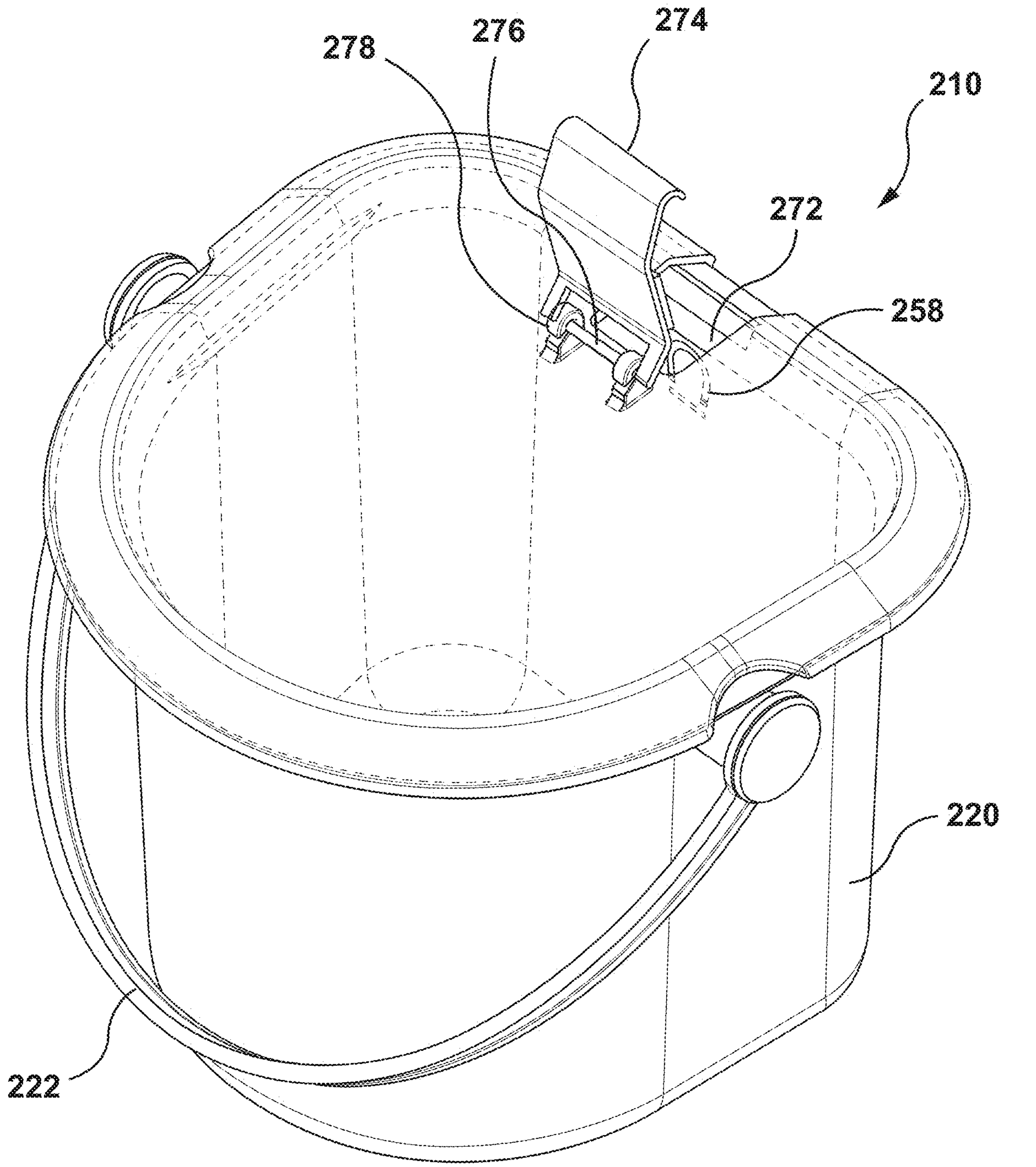
FIG. 9 is a perspective view of another container with lid without a flexible band.
Figure 10:
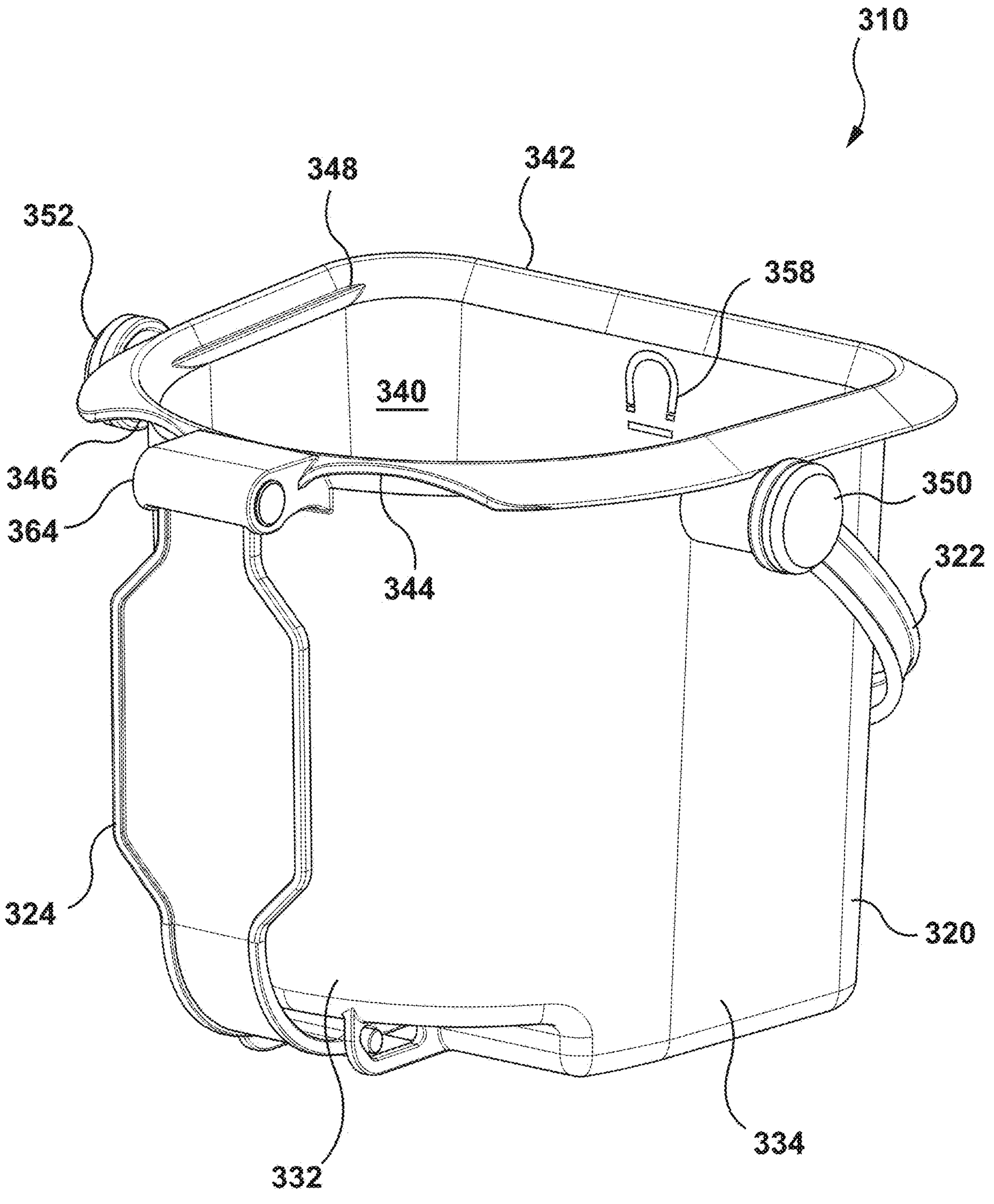
FIG. 10 is a top perspective view of still another container.

Turning now to FIG. 9, an exemplary embodiment of the container is shown at 210. The container 210 is substantially the same as the above-referenced container and consequently the same reference numerals but indexed by 200 are used to denote structures corresponding to similar structures in the containers. In addition, the foregoing description of the container 10 is equally applicable to the container 210 except as noted below.

The container 210 includes a container body 220 and a bail 222 attached to the container body 220. It will be appreciated that a flexible band may be attached to the container body 220 as discussed above. The front of the container 210 defines an area for housing a magnet for supporting the brush. Indicia 258, such as an image of a magnet, may be provided on the inner surface of the front to indicate the location of the magnet.

The container 210 may also include a lid 270 that removably attaches to the top of the container body 220, for example via a snap fit. The lid 270 may include an opening 272 at a front of the lid 270 adjacent the front of the container body 220. The opening may be closed by a flap 274, which is movable between one or more open positions shown in FIG. 9 and a closed position attached to the front of the container body 220, for example by a snap fit. The flap 274 may be removably attached to the lid 270 in a suitable manner. For example, the flap 274 may include a bar 276 that removably attaches to clips 278 projecting upward from and opening to a rear of the lid 270. The clips 278 also allow the bar 276 to pivot relative to the clips 278 for opening and closing the flap 274. In an embodiment, the lid 270 and/or flap 274 may include a suitable seal for sealing to the container body 220.

Turning now to FIGS. 10-15, another exemplary embodiment of the container is shown at 310. The container 310 is substantially the same as the above-referenced container 10, and consequently the same reference numerals but indexed by 300 are used to denote structures corresponding to similar structures in the containers. In addition, the foregoing description of the container 10 is equally applicable to the container 310 except as noted below.

The container 310 includes a container body 320, a bail 322 attached to the container body 320, and a flexible band 324 attached to the container body 320. The container body 320 includes a front 330, a rear 332, a right side 334, a left side 336, and a bottom 338 that define a cavity 340 for receiving the coating material. The front 330, rear 332, right side 334, and left side 336 each include a rim portion extending around tops thereof that is collectively referred to herein as an upper rim 342. The upper rim 342 includes one or more cutouts, and as shown a pair of cutouts 344 and 346 for user's thumbs providing thumb relief areas whether held in a user's left hand or a user's right hand. The left and right sides 336 and 334 each have a substantially parallel planar portion to one another and curved portions that curve toward the curved rear, and the front 330 may be substantially planar. The right side 334 and left side 336 also include ears 350 and 352 projecting outward therefrom to which the bail 322 is attached, and one or more bars 348, such as a brush wipe bar, on inner surfaces thereof near tops of the sides.

The front 330 of the container 310 defines an area 354 for housing a magnet 356 for supporting the brush. The magnet 356 may be molded into the front 330 or otherwise incorporated into the front such that it extends outward from the front 330 and the inner surface of the front 330 is substantially planar. Indicia 358, such as an image of a magnet, may be provided on the inner surface of the front 330 to indicate the location of the magnet 356.

Turning now to the rear 332 of the container 310, the rear 332 of includes a pair of opposed slots 360 and 362 proximate the bottom 338 and a projection 364 projecting rearwardly from the rear 332 that provides a surface for a user's thumb to rest, for example when the container 310 is being held with the user's hand between the container body 320 and the flexible band 324. The projection 364 may define a cavity for receiving an end of the flexible band 324, and include openings at opposite ends thereof for attachment of the flexible band 324 to the projection 364. As shown, the slots 360 and 362 are in respective projections 366 and 368 that project from the rear 332 and the projection 364 projects from the rim portion of the rear 332. The slots 360 and 362 may each have a first portion, which is substantially horizontal, and a second portion, which is at an obtuse angle from the horizontal portion.

Turning now to the bottom 338 of the container 310, projecting downward from the bottom 338 may be one or more projecting ribs 380 that provide a fingertip grip area, for example when the container 310 is being held with a user's thumb looped around the bail. Also projecting downward from the bottom 338 are one or more stabilizer ribs 382 at a front of the bottom 338 for stabilizing the container. As shown, a plurality of laterally spaced stabilizer ribs are provided.

Referring to the flexible band 324 in detail, the flexible band 324 includes a first end 410 configured to be rotatably attached to the rear 332 proximate a top of the rear 332, for example at the projection 364, and a second end 412 configured to be rotatably attached to the rear 332 proximate a bottom of the rear 332, for example at the opposed slots 360 and 362. The flexible band 324 also includes a substantially planar portion 414 disposed between first and second tubular portions at the first and second ends 410 and 412 respectively. The substantially planar portion 414 may be wider along its length at an area spaced from the first and second ends providing for a secure contact to a user's hand. A pin 424 or other suitable fastener is inserted through the first tubular portion at the first end 410 to attach the first end 410 of the flexible band 324 to the projection 464. Similarly, the second tubular portion may be positioned between the slots 360 and 362 in the projections 366 and 368 proximate the bottom 338 and a pin 426 or other suitable fastener is inserted through the tubular portion to attach the second end 412 of the flexible band 324 to the projections 366 and 368. The first end 410 of the flexible band 324 will thereby be rotatably attached to the projection 364, while the second end 412 of the flexible band will be rotatably attached to the projections 366 and 368 and movable within the slots 360 and 362.

A lid may be removably attached to the top of the container body 320 as described above, for example via a snap fit.

The aforementioned elements (e.g., container, bail, flexible band, among others), and the like have been described with respect to interaction between several components and/or elements. It should be appreciated that such elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In the specification and claims, reference will be made to a number of terms that have the following meanings. The singular forms “a”, “an” and “the” include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as “about” is not to be limited to the precise value specified. In some instances, the approximating language may correspond to the precision of an instrument for measuring the value. Moreover, unless specifically stated otherwise, a use of the terms “first,” “second,” etc., do not denote an order or importance, but rather the terms “first,” “second,” etc., are used to distinguish one element from another.

As used herein, the terms “may” and “may be” indicate a possibility of an occurrence within a set of circumstances; a possession of a specified property, characteristic or function; and/or qualify another verb by expressing one or more of an ability, capability, or possibility associated with the qualified verb. Accordingly, usage of “may” and “may be” indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms “may” and “may be.”

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A container comprising:

a container body having a front, a rear, a right side, a left side, and a bottom that define a cavity for receiving a coating material, the front, rear, right side, and left side each include a rim portion extending around tops thereof that form an upper rim, wherein a projection projects rearwardly from the rear, and a recessed continuous curved cutout is formed in the upper rim on each side of the projection extending into the rim defining respective thumb relief areas;

a bail removably attached to the container body; and a flexible band attached to the rear of the container body, wherein the flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user’s hand between the rear of the container body and the flexible band.

2. The container according to claim 1, further comprising a lid removably attached to a top of the container body, wherein the lid includes a cutout that defines with the front of the container body an opening for receiving an attachment.

3. The container according to claim 2, further including a flap removably attached to the lid and moveable between an open position allowing access to the cavity and a closed position closing the opening.

4. The container according to claim 3, wherein the lid includes one or more clips and the flap includes a bar pivotally attached to the one or more clips.

5. The container according to claim 4, wherein the one or more clips includes a plurality of clips projecting upward from and opening to a rear of the lid.

6. The container according to claim 3, wherein the lid includes a plurality of clips projecting upward from and opening to a rear of the lid to allow for receipt and removal of the flap.

7. The container according claim 1, further comprising a magnet, wherein the container body includes an area projecting outward from the front of the container body in which the magnet is disposed.

8. The container according to claim 7, further comprising indicia on an inner surface of the front of the container body for identifying a location of the magnet.

9. The container according claim 1, further comprising a brush wipe bar projecting inward from an inner surface of at least one of the left side or right side.

10. The container according to claim 1, further comprising one or more grip ribs projecting downward from the bottom of the container body to provide a fingertip grip area.

11. The container according to claim 1, further comprising one or more stabilizer ribs projecting downward from a front portion of the bottom of the container body.

12. The container according to claim 11, wherein the one or more stabilizer ribs includes a plurality of laterally spaced stabilizer ribs.

13. The container according to claim 1, wherein the lid is removably attached to the top of the container body at the upper rim.

14. The container according to claim 1, wherein the rear includes a pair of opposed slots proximate the bottom, each slot having a first substantially horizontal portion and a second portion at an obtuse angle from the horizontal portion, and wherein the flexible band is movably attached to the rear of the container body by a fattener in the slots.

15. A container comprising:

a container body having a front, a rear, a right side, a left side, and a bottom that define a cavity for receiving a coating material, the front, rear, right side, and left side each include a rim portion extending around tops thereof that form an upper rim, wherein a projection projects rearwardly from the rear, and a recessed continuous curved cutout is formed in the upper rim on each side of the projection extending into the rim defining respective thumb relief areas;

a bail removably attached to the container body;

a flexible band attached to the rear of the container body; and a lid assembly removably attached to a top of the container body, the lid assembly including a lid with a cutout that defines with the front of the container body an opening for receiving an attachment, and a flap removably attached to the lid and moveable between an open position allowing access to the cavity and a closed position closing the opening, wherein the flap includes a bar and the lid includes one or more clips defining an open space to receive the bar to pivotally attach the bar to the one or more clips.

16. The container according to claim 15, wherein the one or more clips includes a plurality of clips projecting upward from and opening to a rear of the lid.

17. The container according to claim 15, further comprising a magnet, wherein the container body includes an area projecting outward from the front of the container body in which the magnet is disposed.

18. The container according to claim 15, wherein the one or more clips includes a plurality of clips projecting upward from and the open space of each clip opens to a rear of the lid to allow for receipt and removal of the flap.

19. A container comprising:

a container body having a front, a rear, a right side, a left side, and a bottom that define a cavity for receiving a coating material, the front, rear, right side, and left side each include a rim portion extending around tops thereof that form an upper rim, wherein a projection projects rearwardly from the rear, and a recessed continuous curved cutout is formed in the upper rim on each side of the projection extending into the rim defining respective thumb relief areas;

a flexible band attached to the rear of the container body; and a lid assembly removably attached to a top of the container body at the upper rim, the lid assembly including a lid with a cutout that defines with the front of the container body an opening for receiving an attachment, and a flap removably attached to the lid and moveable between an open position allowing access to the cavity and a closed position closing the opening.

20. The container according to claim 19, wherein the lid includes a plurality of clips projecting upward from and opening to a rear of the lid to allow for receipt and removal of the flap.

* * * * *